T866008

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 22

783,425

OLEAGINOUS GELS FROM POLYOLEFIN MICROPARTICLES

Charles W. Hock, Wilmington, Del., assignor to Hercules Incorporated, Wilmington, Del., a corporation of Delaware

Filed Dec. 12, 1968. Published Sept. 2, 1969
Int. Cl. C10m *5/10;* C10l *7/02*
U.S. Cl. 252—59
No Drawing. 6 Pages Specification

Oleaginous gels are prepared by subjecting a mixture of olefin polymer particles to high shear agitation in an organic diluent at a temperature at which the polymer remains in solid form. The olefin polymer is in the form of small particles of less than one micron in at least one dimension. They can be polymers or copolymers of α-olefins of 2 to 6 carbon atoms which are about 50 to 90% crystalline. Small particles can be prepared by a nitric acid treatment which fractures the bonds between individual microcrystals to prepare a friable, loosely bound accumulation of microcrystals, whose shape depends on the form of polymer at the start of the acid treatment. The product from treatment of a bulk polymer which has been crystallized from the melt is comprised of shingle-shaped lamallae, whereas that from an oriented film is comprised of needle-shaped fibrils. Either of these particle types can be employed in the invention. The high shear agitation is preferably accomplished by ultrasonic vibration which causes the polymer-diluent mixture to gel to the consistency of a smooth, non-flowable grease. Such gels are usable as lubricants, bonding agents for paper or as fillers for other plastic materials.